UNITED STATES PATENT OFFICE.

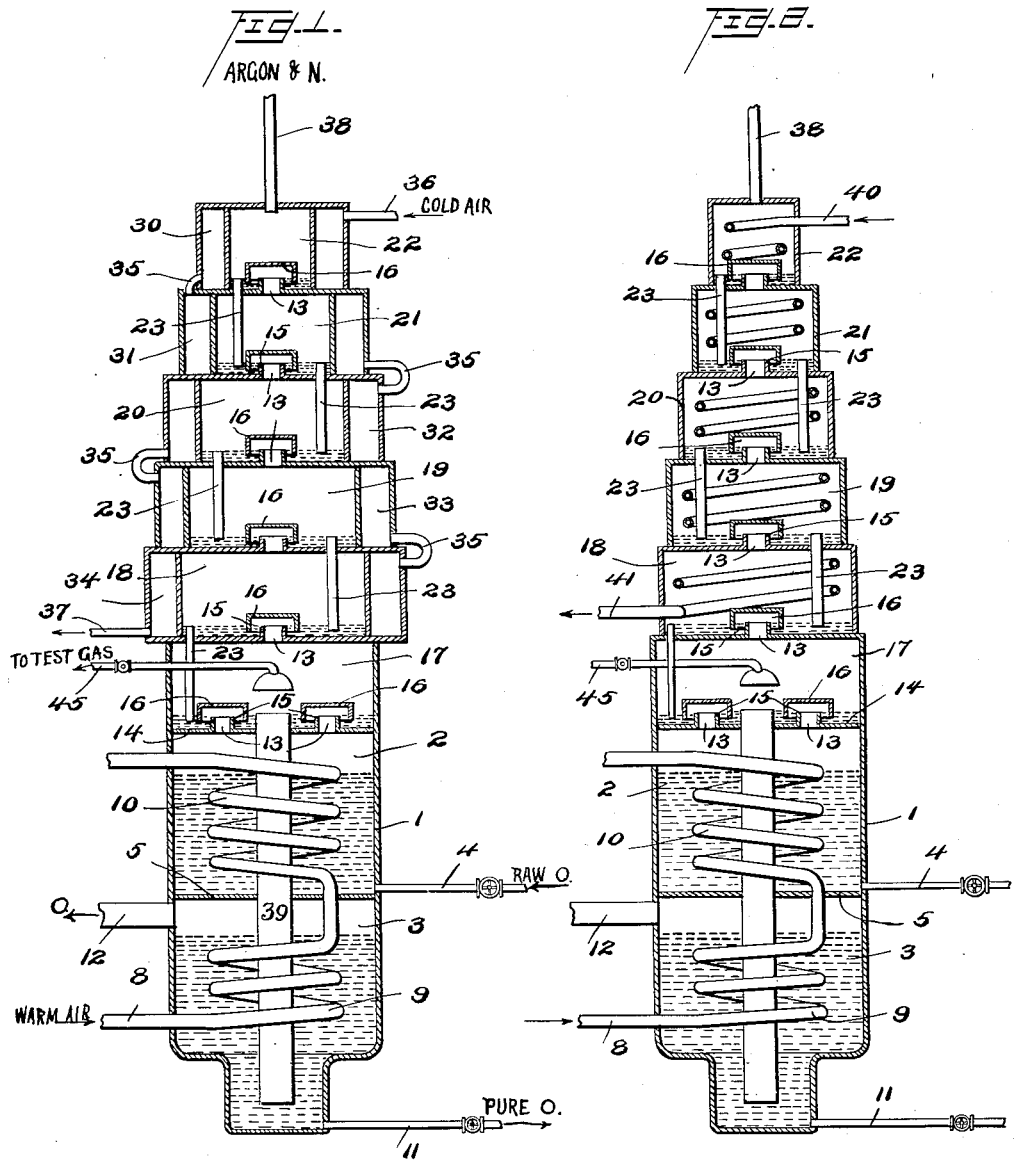

MAX VON RECKLINGHAUSEN, OF NEW YORK, N. Y., ASSIGNOR TO AIR REDUCTION COMPANY, OF NEW YORK, N. Y., A CORPORATION OF NEW YORK.

APPARATUS FOR SEPARATING GASES.

1,403,723. Specification of Letters Patent. Patented Jan. 17, 1922.

Application filed March 15, 1917. Serial No. 155,070.

*To all whom it may concern:*

Be it known that I, MAX VON RECKLINGHAUSEN, a German citizen, and a resident of the city of New York, county of New York, State of New York, have invented certain new and useful Improvements in Apparatus for Separating Gases, of which the following is a specification.

My invention has relation to an apparatus for separating gaseous mixtures into their constituent parts and it has for one of its objects to provide an apparatus which not only may be economically constructed but which may be efficiently and economically employed for the practicing of my method or process.

Another object of my invention is to provide an apparatus comprising a rectifying column wherein and whereby the temperature at different points therein may be controlled so as to cause or bring about efficient separation of the gases of the mixture being treated for rectification.

My invention is particularly designed for the separation of gases, the temperatures of the boiling points of two of which are not greatly different, and it is therefore a further object of my invention to maintain practically constant different temperatures at the top and bottom of the rectifying column, or at other points therein, such temperatures being separated from each other, that is, being different from each other to an extent necessary or essential to the effecting of complete separation of the gases even though the temperatures of their liquefying points are relatively close together.

In the accompanying drawings I have illustrated two forms of apparatus embodying my invention and by which the method invented by me may be carried out. It will be understood that changes in the details of the apparatus may be made within the scope of the claims without departing from my invention.

In order that my invention may be more readily and clearly comprehended and its practical advantages more fully appreciated reference should be had to the accompanying drawings in which:

Fig. 1 is a longitudinal sectional view of a rectifying column embodying my invention and by the employment of which my method of separating the gases may be practiced; and Fig. 2 is a similar view showing a rectifying column comprising a modified construction of means for maintaining the temperatures at the top and bottom of the column at certain points.

Before proceeding with a detailed description of the apparatus constituting my invention it should be remarked that my invention is designed primarily and specifically to effect the separation of the small percentage, about 2%, of argon and nitrogen which remains in the oxygen separated from the atmosphere by the usual rectification process employed in the manufacture of commercial oxygen. In other words, if it be desired to secure pure oxygen and argon the commercial oxygen is subjected to a process of rectification in which argon and nitrogen, which may be regarded as impurities in the commercial oxygen, are separated as a mixture. Thereafter the argon and nitrogen may be separated from each other by a suitable apparatus and method such as are described in my co-pending application filed March 15, 1917, Serial No. 155,069.

Referring to the drawings, 1 designates a receptacle constituting the lower end portion of a rectification column which receptacle is divided into two chambers 2 and 3, the former being adapted to receive and to be charged with what may be termed raw oxygen containing what may be described as impurities, argon and nitrogen. The raw oxygen may be introduced into the chamber 2 through a valve controlled pipe 4.

The receptacle 1 is provided with a transverse dividing plate 5 for separating the receptacle 1 into the two chambers 2 and 3.

The raw oxygen in the chamber 2 to be rectified is boiled by the passage of relatively warm air or other gas through a pipe 8 having coiled portions 9 and 10 situated respectively in the chambers 3 and 2. The chamber 3 contains pure oxygen resulting from the rectification process, and such oxygen may be withdrawn either as a liquid through the valve controlled pipe 11 or as a gas through the pipe 12. The warm air in its passage through the pure oxygen in chamber 3 is cooled and in cooling causes boiling of said oxygen. It then passes on through the raw oxygen or unrectified oxygen in the chamber 2 and causes boiling of the latter. The gas resulting from such latter boiling passes upwardly through the openings 13 formed in the transverse closing plate or partition 14. These openings are surrounded by upwardly extending flanges 15 over which are positioned inverted cup shaped members 16 in known manner. The rectification column is divided into a plurality of rectifying compartments 17, 18, 19, 20, 21 and 22, the transverse area of which gradually decreases. The compartments 17, 18, etc., are in communication successively through openings 13, surrounded by upwardly extending flanges 15 over which cup shaped members 16 are positioned, as already described and in known manner. The several compartments 17, 18, 19, etc., are also in communication successively through short sections of tubular members 23 arranged in known manner as shown.

As already stated the boiling of the raw oxygen in the chamber 2 gasifies the same and the gases thus produced pass upwardly through the openings 13 into the compartment 17. Some of the gas is liquefied in the compartment 17. The temperature of this compartment should be maintained at about $-182°$ C., about four degrees above the boiling point of argon, but just about the boiling point of oxygen. The result therefore is that the liquefied gas collected or which remains in the compartment 17 is pure oxygen. The mixture of oxygen, argon and nitrogen gases travels on upwardly through the successive upper compartments of the column, forcing its way through the different layers of liquefied gas upon the bottoms of the successive compartments.

In order to insure that all of the oxygen of the gaseous mixture shall be liquefied and that all of the argon and nitrogen may be caused or permitted to escape from the column, I provide means for causing or for maintaining a practically constant lower temperature in the uppermost compartment than in the succeeding lower compartments, the temperature gradually rising from the compartment 22 down to the compartment 18. The compartment 22 is maintained at a temperature of about $-186.1°$ C. These temperatures may vary somewhat, but as far as is possible a practically constant difference in temperature between the top and bottom compartments should be maintained, the temperature in the top compartment being approximately that of the boiling point of argon at atmospheric pressure. The boiling point of liquefied nitrogen being still lower it follows that if the temperatures be properly maintained for separating the oxygen and argon the separation of the nitrogen and argon will be effected, as it were automatically.

For the purpose of controlling the temperatures within the successive compartments 22 to 18 inclusive I have surrounded the same with chambers 30, 31, 32, 33 and 34, which chambers are placed in communication with each other by connecting sections of tube 35. Cold air or other gas at the required temperature is introduced from any suitable source through a pipe 36 into the chamber 30 surrounding the compartment 22 and passes successively through the lower chambers 31, 32, 33 and 34, escaping finally at a temperature of approximately $-182°$ C. through a pipe 37. The cold air or other gas passes from one surrounding chamber to the next through the connecting or communicating tubular sections 35.

The mixture of argon and nitrogen escapes through a pipe 38 and may be collected in any suitable tank or may be conducted directly into a suitable apparatus, such as is described in my application above identified for separating the argon and nitrogen from each other.

The pure oxygen which is separated from the mixture collects in the chamber or compartment 17; flows out of the same through the pipe 39; and is discharged into the lower part of the chamber 3.

I have discovered that by reducing the transverse area and consequently the volume of the successive compartments 18, 19, etc., I am enabled to maintain more constantly and accurately the necessary differences in temperature between the top and bottom of the rectifying column; that is to say, between the top compartment 22 and the bottom compartment 18, whereby the separation of the argon and nitrogen from the oxygen is more completely and efficiently brought about.

In the rectifying column shown in Fig. 2 the construction is much the same as that shown in Fig. 1, the difference being that in the construction shown in Fig. 2 the surrounding temperature controlling chambers 30, 31, 32, 33 and 34 are omitted and in lieu thereof I have provided a pipe 40 through which the cold air or other gas passes, said pipe entering the top-most compartment 22 and passing thence from compartment to compartment, finally leaving the compartment 18 as shown at 41. The portions of the pipe 40 within the respective compartments 22, 21, etc. are coiled as shown. The temperature of the cold air or other gas when it enters the first compartment 22 is about $-186.1°$ C. and gradually increases until when it escapes at 41 its temperature is about $-182°$ C., the length and diameter of this pipe being so chosen that this effect is obtained in the best possible way.

By maintaining a constant difference in temperature of about four degrees between the lower compartment 18 and the uppermost compartment 22 I am enabled to effect a nearly complete separation of the oxygen from the argon and nitrogen, whereby the former may be delivered into the chamber 3 in a pure state, while the mixture of argon and nitrogen may be conveyed away to be treated as above suggested.

For the purpose of testing the gas which escapes from the compartment 17 I have provided a valve controlled outlet at 45. Similar outlets for testing or ascertaining the quality of the gaseous product may be provided in others of the compartments.

I claim:—

1. In an apparatus for separating gases, the combination in a rectifying column of a plurality of compartments, the transverse area of successive compartments from the bottom toward the top of said column decreasing, and means for conveying a cooling medium successively in heat interchanging relation with the respective compartments, the uppermost compartment being first subjected to the cold of said medium whereby the temperature in the uppermost compartment is lower than in the lowermost compartment.

2. In an apparatus for separating gases, which boil at different temperatures under atmospheric pressure, the combination in a rectifying column of a plurality of compartments, the transverse areas of said compartments decreasing from the lowermost to the uppermost compartments and means for conveying cooling medium in heat interchanging relation first with the uppermost and then successively with the lower compartments, said cooling medium being adapted to maintain a substantially constant temperature in the uppermost compartment and a substantially constant temperature in the lowermost compartment.

3. In an apparatus of the character described, the combination in a rectifying column, of a plurality of compartments with means surrounding said compartments to assist in controlling the temperature within said compartments and means permitting circulation of a cooling medium through said first mentioned means in heat interchanging relation first with the uppermost and successively with the lower compartments.

4. In an apparatus of the character described, the combination in a rectifying column of a plurality of compartments with chambers surrounding the said compartments, means for supplying a cold gas to the uppermost chamber and means for conducting the said gas successively from one chamber to another to thereby assist in controlling the temperature in the respective compartments, substantially as described.

In testimony that I claim the foregoing as my invention, I have hereunto signed my name this 9th day of March, A. D. 1917.

MAX von RECKLINGHAUSEN.